(12) United States Patent
Huang et al.

(10) Patent No.: US 8,513,908 B2
(45) Date of Patent: Aug. 20, 2013

(54) FAN SPEED CONTROL CIRCUIT

(75) Inventors: Xiang-Ji Huang, Shenzhen (CN); Jian Fu, Shenzhen (CN); Zhi-Jiang Yao, Shenzhen (CN); Li-Fu Xu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 207 days.

(21) Appl. No.: 13/166,364

(22) Filed: Jun. 22, 2011

(65) Prior Publication Data

US 2012/0112678 A1    May 10, 2012

(30) Foreign Application Priority Data

Nov. 8, 2010    (CN) .......................... 2010 1 0534943

(51) Int. Cl.
*H02P 7/00*    (2006.01)

(52) U.S. Cl.
USPC .............. 318/471; 318/268; 318/67; 318/66; 318/68; 318/599; 332/109; 332/120; 332/144; 332/145; 332/150; 361/694; 361/695; 361/161

(58) Field of Classification Search
USPC .............. 318/471, 268, 67, 66, 68, 599, 41; 332/109, 120, 144, 145, 150, 162; 361/694, 361/695, 161

See application file for complete search history.

(56) References Cited

U.S. PATENT DOCUMENTS

| | | | |
|---|---|---|---|
| 6,428,282 B1 * | 8/2002 | Langley | 417/2 |
| 6,931,306 B2 * | 8/2005 | Frankel et al. | 700/300 |
| 7,098,617 B1 * | 8/2006 | Oljaca et al. | 318/268 |
| 7,117,054 B2 * | 10/2006 | Frankel et al. | 700/97 |
| 7,138,781 B2 * | 11/2006 | Murray et al. | 318/400.04 |
| 8,374,716 B1 * | 2/2013 | Frankel et al. | 700/170 |

* cited by examiner

*Primary Examiner* — Rita Leykin
(74) *Attorney, Agent, or Firm* — Altis Law Group, Inc.

(57) ABSTRACT

A fan speed control circuit includes a first fan, a second fan, a first temperature sensor, a second temperature sensor, a PWM regulator, and a driving module. The first temperature sensor senses a temperature of the first component to generate a first temperature signal. The second temperature sensor senses a temperature of a second component to generate a second temperature signal. The PWM regulator is connected to the first temperature sensor and the second temperature sensor. The PWM regulator generates a first PWM signal according to the first temperature signal and generates a second PWM signal according to the second temperature signal. The driving module is connected to the PWM regulator. The driving module generates a first driving voltage provided to the first fan according to the first PWM signal. The driving module also generates a second driving voltage provided to the second fan according to the second PWM signal.

12 Claims, 2 Drawing Sheets

FAN SPEED CONTROL CIRCUIT

BACKGROUND

1. Technical Field

The present disclosure relates to fan speed control circuits, more particularly to a fan speed control circuit, which can control speeds of multiple fans.

2. Description of Related Art

With the development of the computer industry, operating frequencies of most components in computer systems have very high performance and generate a great deal of heat. If the heat is not dissipated in a timely fashion, the computer system may be seriously damaged. A fan is usually used to lower the temperature of the computer system. Generally, the faster the fan speed, the higher the heat dissipation effect. However, higher fixed fan speeds add noise and use a great deal of energy, which is wasteful and unnecessary when the heat generated within a computer enclosure is at a minimum. Therefore, it is necessary to control the fan speed.

However, a conventional fan speed control circuit only can control one fan speed. When multiple fans are used, each fan needs a fan speed control circuit, which is expensive.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
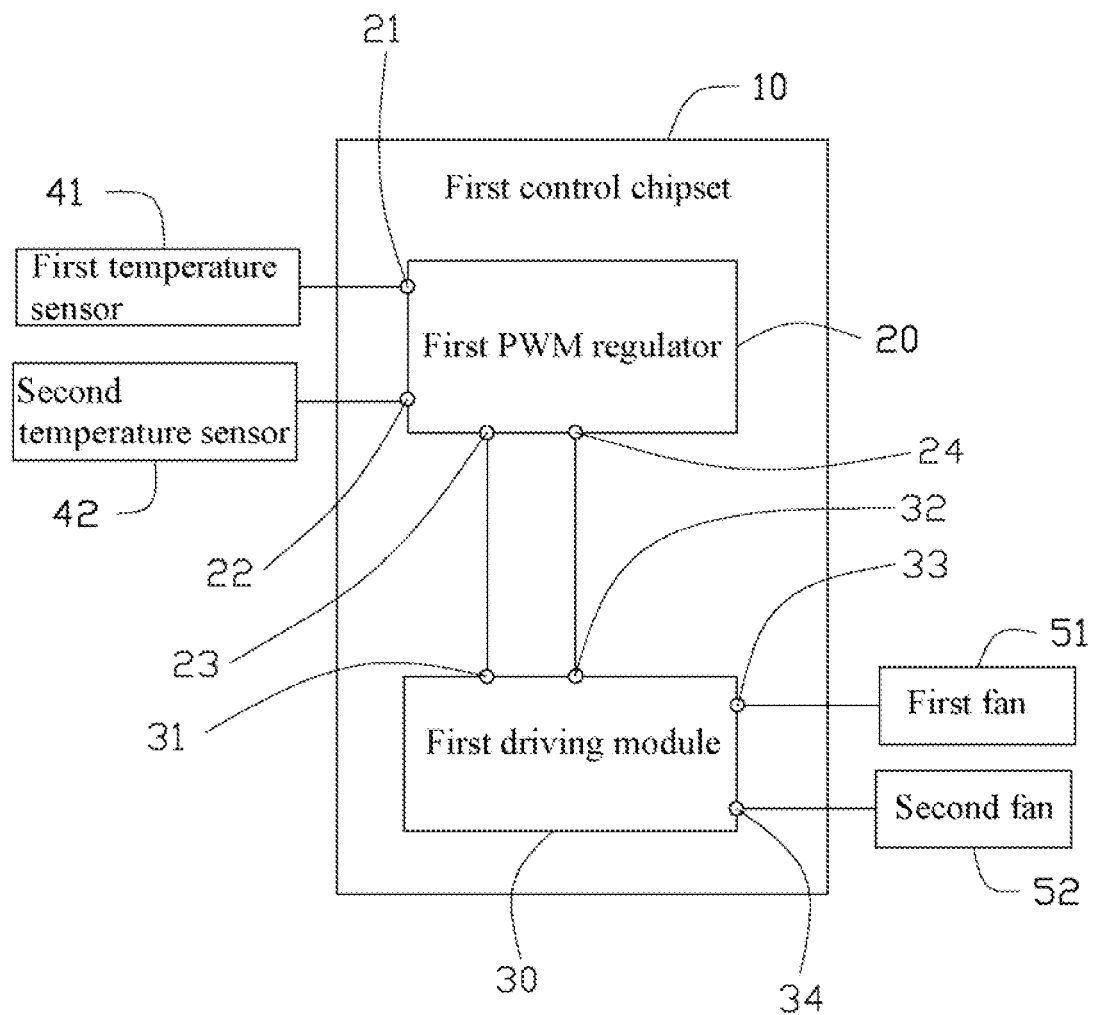
FIG. 1 is a block diagram of an embodiment of a fan speed control circuit.

Referring to FIG. 1, a fan speed control circuit in accordance with an embodiment includes a first control chipset 10, a first temperature sensor 41, and a second temperature sensor 42. The first control chipset 10 includes a first PWM (pulse-width modulation) regulator 20 and a first driving module 30. The fan speed control circuit is used to control the speeds of a first fan 51 and a second fan 52. In one embodiment, the fan speed control circuit is equipped in a computer. The first fan 51 and the second fan 52 can be mounted in the computer to dissipate heat from the computer. For example, the first fan 51 is attached to a first component of the computer to dissipate heat generated by the first component. The second fan 52 is attached to a second component to dissipate heat generated by the second component. The first temperature sensor 41 thermally contacts the first component to sense a first component temperature. The first temperature sensor 41 generates a first temperature signal, which represents the first component temperature. The second temperature sensor 42 thermally contacts the second component to sense a second component temperature. The second temperature sensor 42 generates a second temperature signal, which represents the second component temperature.

The first PWM regulator 20 includes a first monitoring end 21, a second monitoring end 22, a first output end 23, and a second output end 24. The first monitoring end 21 is connected to the first temperature sensor 41 to receive the first temperature signal. The second monitoring end 22 is connected to the second temperature sensor 42 to receive the second temperature signal. The first PWM regulator 20 generates a first PWM signal according to the first temperature signal. The first PWM regulator 20 generates a second PWM signal according to the second temperature signal. For example, if the first temperature signal indicates the first component temperature is too high, a duty cycle of the first PWM signal is large.

The first driving module 30 includes a first input end 31, a second input end 32, a first driving end 33, and a second driving end 34. The first input end 31 is connected to the first output end 23. The second input end 32 is connected to the second output end 24. The first output end 23 outputs the first PWM signal to the first input end 31. The second output end 24 outputs the second PWM signal to the second input end 32. The first driving module 30 generates a first driving voltage according to the first PWM signal. The second driving module 30 generates a second driving voltage according to the second PWM signal. The first driving voltage is supplied to the first fan 51 via the first driving end 33 to drive the first fan 51 to rotate. The second driving voltage is supplied to the second fan 52 via the second driving end 34 to drive the second fan 52 to rotate.

To illustrate how the fan speed control circuit works, for example, the first temperature sensor 41 senses the first component temperature to generate the first temperature signal. The first PWM regulator 20 generates the first PWM signal according to the first temperature signal. The first driving module 30 generates the first driving voltage according to the first PWM signal. The first driving voltage is supplied to the first fan 51 to drive the first fan 51 to rotate. Simultaneously, the second temperature sensor 42 senses the second component temperature to generate the second temperature signal. The first PWM regulator 20 generates the second PWM signal according to the second temperature signal. The first driving module 30 generates the second driving voltage according to the second PWM signal. The second driving voltage is supplied to the second fan 52 to drive the second fan 52 to rotate. Therefore, the fan speed control circuit controls the first fan 51 and the second fan 52 simultaneously.

Figure 2:
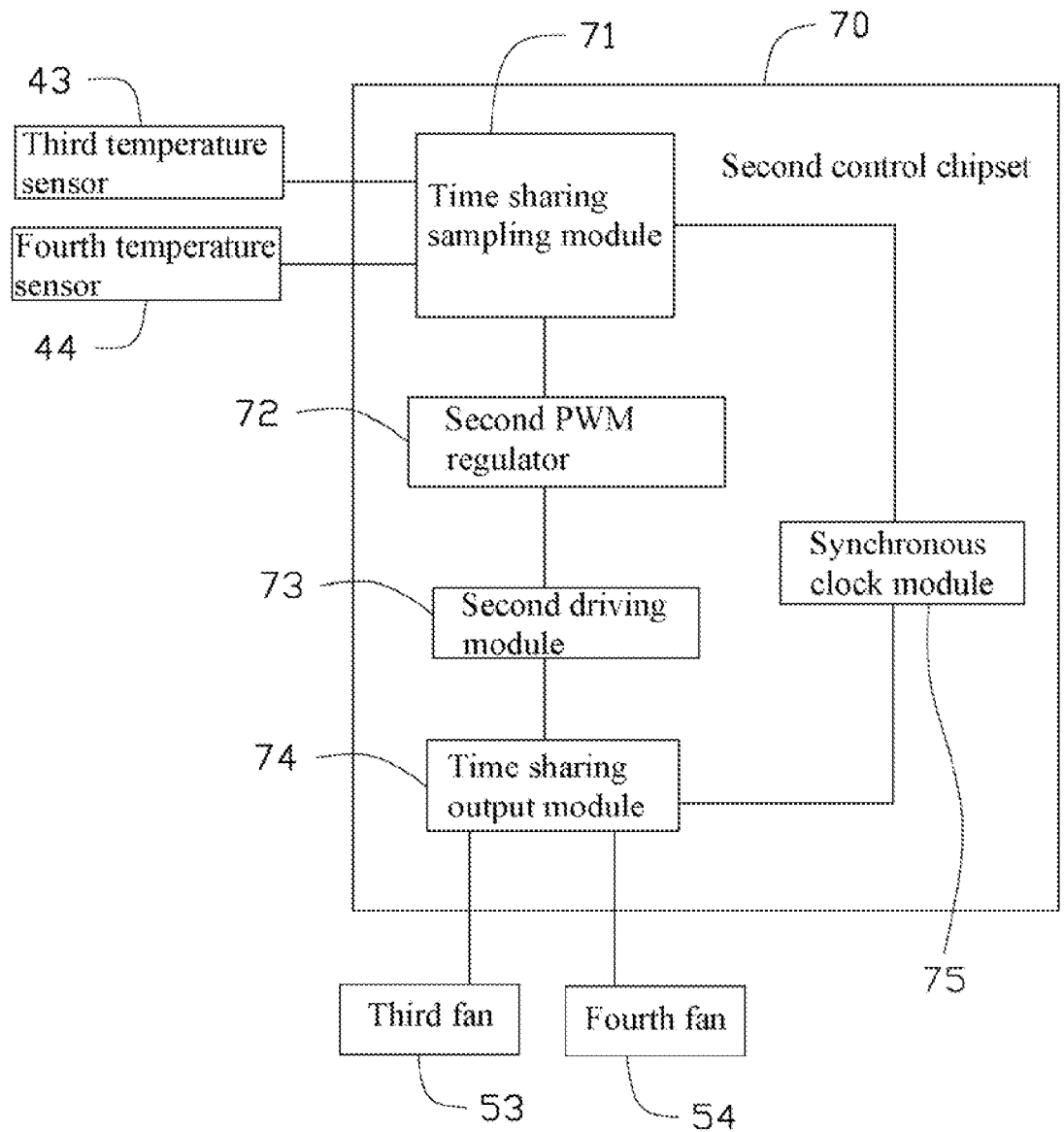
FIG. 2 is a block diagram of another embodiment of a fan speed control circuit.

Referring to FIG. 2, another embodiment of a fan speed control circuit is shown. The embodiment includes a second control chipset 70, a third temperature sensor 43, and a fourth temperature sensor 44. The embodiment is used to control speeds of a third fan 53 and a fourth fan 54. In this embodiment, the third fan 53 is attached to a third component of the computer to dissipate heat generated by the third component. The fourth fan 54 is attached to a fourth component to dissipate heat generated by the fourth component. The third temperature sensor 43 thermally contacts the third component to sense a third component temperature. The third temperature sensor 43 generates a third temperature signal, which represents the third component temperature. The fourth temperature sensor 44 thermally contacts the fourth component to sense a fourth component temperature. The fourth temperature sensor 44 generates a fourth temperature signal, which represents the fourth component temperature.

The second control chipset 70 includes a time sharing sampling module 71, a second PWM regulator 72, a second driving module 73, a time sharing output module 74, and a synchronous clock module 75. The time sharing sampling module 71 and the time sharing output module 74 are connected to the synchronous clock module 75. Therefore, the time sharing sampling module 71 and the time sharing output module 74 are synchronous.

The time sharing sampling module 71 is connected to the third temperature sensor 43 and the fourth temperature sensor 44. The time sharing sampling module 71 can periodically sample the third temperature signal and the fourth temperature signal at different time periods during a cycle. The time sharing sampling module 71 outputs a sampled signal to the second PWM regulator 72. The second PWM regulator 72 generates a sampled PWM signal, which is transmitted to the second driving module 73. The second driving module 73 generates a sampled driving voltage according to the sampled PWM signal. The sampled driving voltage is transmitted to the time sharing output module 74. The time sharing output module 74 supplies the sampled driving voltage to a corresponding fan, the third fan 73 or the fourth fan 74. Because the time sharing sampling module 71 and the time sharing output module 74 are synchronous, the third fan 53 can be driven according to the third temperature signal, and the fourth fan 54 can be driven according to the fourth temperature signal.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A fan speed control circuit, comprising:
a first fan adapted to dissipate heat for a first component;
a second fan adapted to dissipate heat for a second component;
a first temperature sensor adapted to sense a temperature of the first component to generate a first temperature signal;
a second temperature sensor adapted to sense a temperature of the second component to generate a second temperature signal;
a PWM regulator connected to the first temperature sensor and the second temperature sensor, the PWM regulator adapted to generate a first PWM signal according to the first temperature signal and adapted to generate a second PWM signal according to the second temperature signal; and
a driving module connected to the PWM regulator, the driving module adapted to generate a first driving voltage to the first fan according to the first PWM signal, and to generate a second driving voltage to the second fan according to the second PWM signal;
a time sharing sampling module, wherein the PWM regulator is connected to the first temperature sensor and the second temperature sensor via the time sharing sampling module, and the time sharing sampling module is adapted to periodically sample the first temperature signal and the second temperature signal at different time periods during a cycle.

2. The fan speed control circuit of claim 1, wherein the PWM regulator comprises a first monitoring end and a second monitoring end, the first monitoring end is connected to the first temperature sensor to receive the first temperature signal, and the second monitoring end is connected to the second temperature sensor to receive the second temperature signal.

3. The fan speed control circuit of claim 2, wherein the PWM regulator comprises a first output end and a second output end, the driving module comprises a first input end and a second input end, the first output end is connected to the first input end to output the first PWM signal to the driving module, and the second output end is connected to the second input end to output the second PWM signal to the driving module.

4. The fan speed control circuit of claim 3, wherein the driving module comprises a first driving end and a second driving end, the first driving end is connected to the first fan to supply the first driving voltage to the first fan, and the second driving end is connected to the second fan to supply the second driving voltage to the second fan.

5. The fan speed control circuit of claim 1, further comprising a time sharing output module, wherein the driving module is connected to the first fan and the second fan via the time sharing output module, and the time sharing output module is adapted to periodically provide the first driving voltage and the second driving voltage at different time periods during a cycle.

6. The fan speed control circuit of claim 5, further comprising a synchronous clock module, wherein the time sharing sampling module and the time sharing output module are connected to the synchronous clock module to maintain synchronization.

7. A fan speed control circuit, comprising:
a first temperature sensor adapted to sense a first temperature;
a second temperature sensor adapted to sense a second temperature;
a PWM regulator connected to the first temperature sensor and the second temperature sensor, the PWM regulator adapted to generate a first PWM signal according to the first temperature and a second PWM signal according to the second temperature; and
a driving module connected to the PWM regulator, the driving module adapted to drive a first fan to rotate in a first speed according to the first PWM signal and drive a second fan to rotate in a second speed according to the second PWM signal;
a time sharing sampling module, wherein the PWM regulator is connected to the first temperature sensor and the second temperature sensor via the time sharing sampling module, and the time sharing sampling module is adapted to periodically sample the first temperature and the second temperature at different time periods during a cycle.

8. The fan speed control circuit of claim 7, wherein the PWM regulator comprises a first monitoring end and a second monitoring end, the first monitoring end is connected to the first temperature sensor to receive a first temperature signal, and the second monitoring end is connected to the second temperature sensor to receive a second temperature signal.

9. The fan speed control circuit of claim 8, wherein the PWM regulator comprises a first output end and a second output end, the driving module comprises a first input end and a second input end, the first output end is connected to the first input end to output the first PWM signal to the driving module, and the second output end is connected to the second input end to output the second PWM signal to the driving module.

10. The fan speed control circuit of claim 9, wherein the driving module is adapted to generate a first driving voltage according to the first PWM signal and generate a second driving voltage according to the second PWM signal, the driving module comprises a first driving end and a second driving end, the first driving end is connected to the first fan to supply the first driving voltage to the first fan, and the second driving end is connected to the second fan to supply the second driving voltage to the second fan.

11. The fan speed control circuit of claim 7, further comprising a time sharing output module, wherein the driving module is adapted to generate a first driving voltage according to the first PWM signal and generate a second driving voltage according to the second PWM signal, the driving module is connected to the first fan and the second fan via the time sharing output module, the time sharing output module is adapted to periodically provide the first driving voltage and the second driving voltage at different time periods of a cycle.

12. The fan speed control circuit of claim 11, further comprising a synchronous clock module, wherein the time sharing sampling module and the time sharing output module are connected to the synchronous clock module to maintain synchronization.

\* \* \* \* \*